Patented June 20, 1933

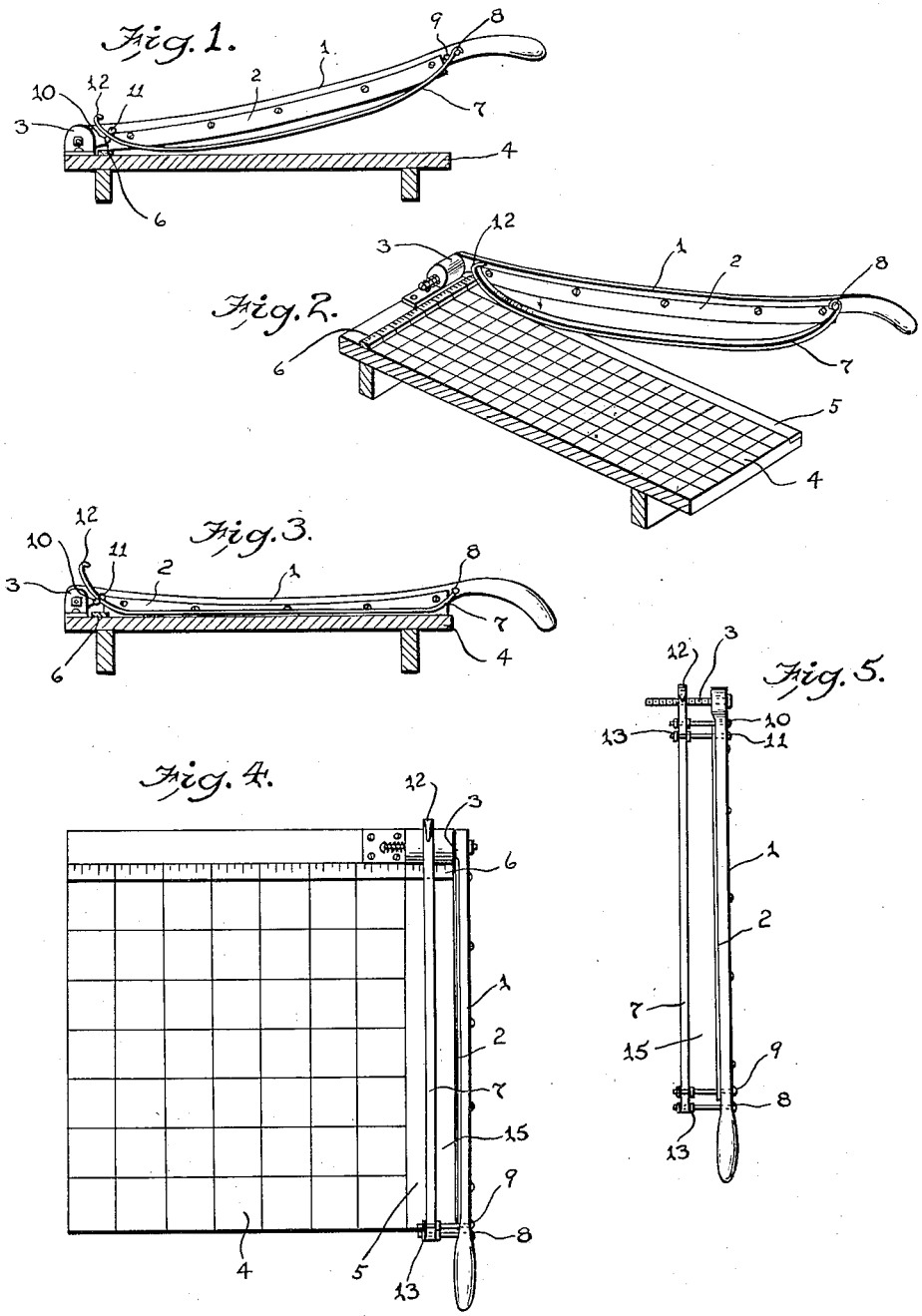

1,914,966

UNITED STATES PATENT OFFICE

EUGENE R. WEISBENDER, OF MANHATTAN, KANSAS

MATERIAL TRIMMING DEVICE

Application filed November 1, 1932. Serial No. 640,679.

(GRANTED UNDER THE ACT OF MARCH 3, 1883, AS AMENDED APRIL 30, 1928; 370 O. G. 757)

My invention described herein, if patented, may be manufactured and used by or for the Government of the United States for governmental purposes only without the payment to me of any royalty thereon.

My invention relates to material trimming devices and more particularly to means thereon whereby the material to be trimmed is secured and guided before and during the shearing operation.

Previous to my invention it has been generally necessary for the operator of a material trimming device to smooth the material and firmly hold the same in position before and during the cutting thereof in order to obtain an accurate, straight, and even sharp edge cut. To hold the material firmly in position, it has been necessary for the operator to dangerously and inefficiently place his fingers near the cutting edge or inexpediently clamp the material in position before the cutting thereof. The tendency of some materials to curl or roll requires it to be firmly held in position in order to obtain a desired cut. Furthermore, if the material to be cut is not held firmly in position during the cutting, the scissor action of the blades tend to push the material outward from the successive points of shearing. Also, the intersecting blades and the successive points of shearing causes the material to skew or shear with respect to the surface of the table upon which the material rests and to which the blades are attached. If a plurality of superimposed sheets of material are to be cut, the successive points of shearing of the blades causes the lowermost sheet to skew or shift with respect to the surface of the table and further causes the successive sheets to skew or shear with respect to each other. The most common results of the foregoing actions are fraying, curved cuts, unevenness, inaccuracy, buckling, curling, and the like.

Objects of my invention are to prevent the foregoing disadvantages and also the results thereof by providing guiding and retaining means upon a material trimming device whereby the material to be cut is automatically, efficiently, and expediently smoothed, held firmly in position before and during the cutting thereof, and whereby the tendency of the material to creep with the shearing action of the cutter is opposed.

Other objects of my invention will become apparent as the description thereof is developed with reference to the accompanying illustrative examples of types of apparatus having the characteristics of my invention and by which it may be practiced—

Figure 1 is a view in elevation, partly in section, showing a material trimming device with an embodiment of my invention mounted thereon.

Figure 2 is a perspective view, partly in section, of the same but showing a modification in the mounting of my invention.

Figure 3 is a view similar to Figure 1 but showing the lever at rest and also showing a further modification in the mounting of my invention.

Figure 4 is a plan view of a cutter embodying a form of my invention but showing a slight modification in the mounting means from those shown in Figure 2.

Figure 5 is a detailed plan view of a material trimming device with the present invention applied and mounted as shown in Figure 1.

Several embodiments of my invention are known to me but according to that by means of which my invention may be practiced, there is illustrated a material trimming device, having a lever 1, carrying a blade 2, pivotally mounted at 3 on a table or bed 4 having a shearing edge 5 adapted to cooperate with the blade 2, and an abutment 6 which may, if desired, be in the form of a rule or guide. An embodiment of my invention comprises a guiding element 7, preferably in elongated strip form and preferably of such resilient qualities as will yield under stress and return to its normal form or desired position when the stress is released. In a preferred form I have composed this strip of spring steel. The guide element 7 is mounted contiguous to the inner side of the lever 1, by any suitable means 8, 9, 10, and 11, such as bolts, posts, or screws, and in such a way as to extend below the cutting edge of the blade 2, preferably the full length of the shearing edge thereof, in convex form to engage the material in advance of the blade.

Referring particularly to the illustrated applications of my invention, Figures 1 and 5, the guide element 7 may be rigidly or pivotally attached to any suitable means 8, such as a bolt, on the table side of the handle end of the lever 1. Suitable means 9, such as a bolt, may be provided within the curved portion of the guide element 7 and contiguous to the attaching means 8, and suitably positioned to formulate and maintain a downward curve in the guide element 7, and also to increase and maintain the stress of the guide element. Or, as illustrated in Figure 3, means 9 may be omitted if desired. The other end of the guide element should be free to slide at the head of the bed 4 having the abutment 6. Suitable means 10 and 11, such as bolts, may be provided and suitably positioned to formulate and maintain a downward curve in the guide, to increase and maintain the stress of the guide element 7, and also to act as aligning means for the free end of the guide element. Suitable means 12, such as a hook or curved over end, may be provided on the free end of the guide element to engage the means 11, thereby limiting the retraction of the guide beyond a certain point, when the stress is released, i.e., when the lever is raised.

The guide element may be mounted if desired, as illustrated in Figure 4, without the elements 10 and 11, or, as illustrated in Figure 2, the means 9, 10, and 11 may be omitted, thereby leaving the guide element 7 mounted by means 8 only and also permitting the guide element to slide free of other bolts, or means, for increasing and maintaining stress on the element 7. In such a mounting the free end of the guide element may be provided with any suitable anti-friction means 12, such as a curved over end, to act as a shoe when in operation.

The means 8, 9, 10, and 11, if desired, may be provided with any suitable retaining means 13 (Figures 4 and 5), such as nuts or shoulders, to hold the guide element in position and may also serve as means for adjusting or spacing the guide element a suitable distance from the cutting edge, thereby providing a space 15 whereby a portion of the material may be visible for positioning, and other purposes, upon the table 4 and also remain visible throughout the cutting operation.

In the operation and function of my invention, the material to be cut is placed on the table 4 in its desired or predetermined position with respect to the cutting edge and the graduated rule, or abutment 6, as the lever 1 is lowered or depressed for the purpose of cutting the material, the guide element 7, coacting with the table 4, automatically engages and securely holds the material first at or near the abutment or rule 6 and progressively continues to engage, as it flattens out, and to bear smoothly, evenly and firmly upon the material in advance of the successive points of shearing.

However, if desired, the guide element 7 may be so mounted as to engage the material its full length before the first point of shearing occurs. Or, it may be so mounted as to engage the material simultaneously with the point of shearing as it advances through the material.

As the resilient element is forced to flatten out on the bed, by the lowering of the lever, the curve of the element is shortened. Therefore, the force of the element against the bed increases, as the curve is shortened, with the lowering of the lever. The displacement tendency of the material increases as the shearing advances and this increasing displacement tendency is opposed by the latter mentioned increasing force of the element against the bed.

Simultaneously with the shearing operation of the cutter, the guide element 7 slides in an opposite or reverse direction from that of its successive engagements and from that of the advancing points of shearing, whereby the friction tends to counteract or oppose the longitudinal sliding or pushing of the material outward from, and due to, the advancing points of shearing or intersection of the blades. The engaging surface of the guide element 7 may be roughened, if desired, to increase its friction on the material.

By raising the lever 1 the pressure on the material is released and the guide automatically returns to its normal position.

From the foregoing description it will be understood that the material is also instantly and automatically clamped or released by the single operation of the cutting lever, thereby obviating the necessity of separate clamps, holders, adjustments or manual assistance. It will also be understood that an important feature of my invention is the adaptability, of the mechanical features employed, to various types of cutters and shears.

While I have illustrated types of my invention and described the same as embodied in particular forms and combined with particular apparatus, it is to be understood that various modifications and combinations, by which my invention may be practiced, may be made without departing from the spirit of my invention, nor are any limitations to be imposed upon my invention except such as are indicated in the claims appended hereto.

Having thus described my invention, what I claim is:

1. In a material trimming device, the combination of a bed, a cutter cooperating therewith, guiding means mounted upon the cutter, said guiding means comprising a resilient element non-slidably attached to the end of the cutter last to engage the material and extending slidably and substantially parallel to the cutter toward the end of the cutter adapted to first engage the material, an element carried by the cutter to adjustably space the guiding means from the shearing edge of the cutter while at the same time maintain the guiding means substantially parallel with the cutter, means for imposing stress energy upon the guiding means, said guiding means firmly engaging the material at a point in advance of the shearing point of the cutter and remaining firmly in contact therewith throughout the cut portion while at the same time producing a frictional force opposing the displacement action of the material produced by the advancement of the shearing points of said cutter.

2. In combination with a sheet material cutter, including a bed and a cutter cooperating therewith, means carried by the cutter whereby the material to be cut is successively secured to the bed against lateral displacement before and during the shearing action of the cutter in advance of the successive points of shearing and said means riding upon the bed to simultaneously frictionally oppose the directional displacement tendency of the material produced by the advancement of the shearing points of said cutter.

3. In a material trimming device, the combination of a bed, a cutter cooperating therewith, and means mounted upon said cutter for producing a force in opposition to the tendency of the material to creep in the direction of the shearing action of the cutter.

4. In a material trimming device, the combination of a bed having a shearing edge, a cutter cooperating therewith, and guiding means mounted upon said cutter for producing a force in opposition to the tendency of the material, to be cut to creep in the direction of shearing action of the cutter, said guiding means adjustably spaced from the shearing edge of the bed to maintain the point of shearing visible continuously throughout the cutting operation.

5. In a material trimming device, the combination of a bed, a cutter cooperating therewith, guiding means mounted upon said cutter for opposing the tendency of the material, to be cut, to creep with the shearing action of the cutter while at the same time maintaining the point of shearing of the cutter visible at all times throughout the cutting operation, and means for adjusting the guiding means toward and away from the cutter.

6. In a material trimming device, the combination of a bed, a cutter cooperating therewith, guiding means mounted upon said cutter for opposing the displacement forces of the shearing action upon the material to be cut and means to adjustably space the guiding means from the shearing edge.

7. In a material trimming device, the combination of a bed, a cutter cooperating therewith, guiding means mounted upon said cutter, said guiding means progressively engaging the material in advance of the point of shearing of the cutter and producing throughout the length of the cut material a frictional force acting in opposition to any tendency of movement produced by the shearing action of the cutter.

8. In a material trimming device, means for supporting the material to be cut including an abutment to engage one edge thereof, means for cutting the material along another edge thereof, means tending to urge the material into engagement with said abutment upon the operation of said cutting means.

9. In a device of the class described, means adapted to support material to be sheared, said means being provided with a shearing edge, a blade positioned in cooperative relation to said shearing edge whereby said material may be sheared, and means effective upon the operation of said blade tending to oppose lateral and at the same time longitudinal displacement forces produced by the shearing action whereby said material may be maintained in its original relation to said shearing edge throughout the shearing action.

10. In a material trimming device, a bed to support the material to be cut including an abutment to engage and limit the movement of the material on the bed, means to cut the material along one edge thereof which is inclined to move the material away from the abutment, and progressive clamping means carried by the cutter to oppose the cutting movement of the material and maintain the material in engagement with said abutment.

11. In a material trimming device, a bed and a cutter cooperating therewith, an arcuate resilient guiding means mounted upon the cutter to impart frictional engagement with the material on the bed in an opposite direction to the force of cutting, to clamp the same firmly to the bed, said clamping energy increasing with the movement of the cutter toward the bed.

12. In a device of the class described, the combination of means adapted to support material to be sheared, said means being provided with a shearing edge, a blade positioned in cooperative relation to said shearing edge, means to automatically impart by frictional engagement with the material on the support a force in an opposite direction to the shearing action of the blade while at the same time imparting an increasing clamping force for opposing the increasing displacement force as the shearing progresses.

13. In a cutting device, the combination of a blade and a shearing edge in cooperative relation, and means automatically effective upon the operation of said combination for proportionately applying an increasing resistance to the increasing lateral shearing displacement force while at the same time frictionally applying a force opposing longitudinal displacement produced by shearing action.

14. In a material cutting device, the combination of a shearing edge over which the material extends, a blade cooperating with said shearing edge and means progressively engaging the material for preventing displacement of the material laterally with respect to the cutting edge and simultaneously exerting a force on the material in a direction opposite to the longitudinal displacement force caused by the progressive engagement of the blade with the shearing edge.

In testimony whereof I affix my signature.

EUGENE R. WEISBENDER.